(12) United States Patent
Sargin et al.

(10) Patent No.: US 9,280,742 B1
(45) Date of Patent: Mar. 8, 2016

(54) CONCEPTUAL ENHANCEMENT OF AUTOMATIC MULTIMEDIA ANNOTATIONS

(75) Inventors: Mehmet Emre Sargin, Mountain View, CA (US); George Dan Toderici, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 223 days.

(21) Appl. No.: 13/604,590

(22) Filed: Sep. 5, 2012

(51) Int. Cl.
*G06N 5/04* (2006.01)

(52) U.S. Cl.
CPC ........................................ *G06N 5/04* (2013.01)

(58) Field of Classification Search
CPC .................................................. G06N 5/04
USPC ........................................................ 706/12
See application file for complete search history.

(56) References Cited

PUBLICATIONS

Alepidou et al ("A Semantic Tag Recommendation Framework for Collaborative Tagging Systems" IEEE Oct. 9-Oct. 11, 2011).*
Li et al ("Personalizing Automated Image Annotation using Cross-Entropy" 2011).*
Toderici et al ("Finding Meaning on YouTube: Tag Recommendation and Category Discovery" 2010).*

* cited by examiner

*Primary Examiner* — Lut Wong
(74) *Attorney, Agent, or Firm* — Lowenstein Sandler LLP (57) ABSTRACT

Methods and systems for suggesting one or more semantic tags for a media clip are disclosed. In one aspect, a media clip provided by a user is identified, and a first set of semantic tags is generated for the media clip based on a feature vector associated with the media clip. The first set of semantic tags is then provided to a classifier that is trained based on user selection of semantic tags. Further, a second set of semantic tags is obtained from the classifier and is suggested to the user for the media clip.

17 Claims, 6 Drawing Sheets

CONCEPTUAL ENHANCEMENT OF AUTOMATIC MULTIMEDIA ANNOTATIONS

TECHNICAL FIELD

Aspects and implementations of the present disclosure relate to data processing, and more specifically, to managing video clips or other types of data.

BACKGROUND

Video is becoming pervasive on the World Wide Web. In addition to professional content providers (e.g., news organizations, media companies, etc.) providing a wealth of video clips on their websites, everyday users are uploading user-generated video clips to various content hosting websites. In addition, users of such websites may subscribe to be notified of or receive video clips uploaded by or recommended by other users and conveniently view the video clips uploaded by or recommended by these other users. User-generated video clips are typically recorded with digital video cameras and digital still cameras that have video capability, and increasingly, using wireless terminals (e.g., smartphones, etc.) that have still image and video capabilities.

Users may apply one or more "semantic tags" to video clips that characterize the video clips and enable other users to find the video clip when submitting keyword searches to the content hosting website. For example, a user who uploads a video clip of an amusing incident between her cat and her baby might apply the semantic tags "cat," "baby," and "funny" to the video clip.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a method for suggesting semantic tags for media content is provided. The method includes identifying a media clip (e.g., a video clip, an audio clip, a clip containing a combination of video and audio, a video frame, a picture, etc.) that is provided by a user, and generating a first set of semantic tags for the media clip based on a feature vector associated with the media clip. The method may then include providing the first set of semantic tags to a classifier (e.g., a support vector machine [SVM], AdaBoost, a neural network, a decision tree, etc.) that is trained based on user selection of semantic tags, obtaining a second set of semantic tags from the classifier, and suggesting to the user the second set of semantic tags for the media clip.

In some implementations, an apparatus to suggest semantic tags for media content is provided. The apparatus includes a memory to store a media clip and a processing device, coupled to the memory, to input a first set of semantic tags for the media clip to a classifier, where the first set of semantic tags is generated based on a feature vector associated with the media clip, to run the classifier to obtain a second set of semantic tags, and to present the second set of semantic tags to a user as suggestions for the media clip.

In other implementations, a computer readable storage medium is provided. The computer readable storage medium has instructions that cause a computer system to perform operations including: training a classifier on a plurality of input-output mappings, where each of the input-output mappings is associated with a respective media clip and each of the input-output mappings includes: (1) a respective input based on a first set of semantic tags suggested for the respective media clip, the first set of semantic tags generated based on a feature vector associated with the respective media clip, and (2) a respective output based on which one or more semantic tags of the first set of semantic tags are selected; and running the trained classifier to obtain a first set of semantic tags from a second set of semantic tags associated with a media clip.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems are disclosed for suggesting to a user one or more semantic tags for a media clip that the user has uploaded to a server. As used herein, a media clip can include a video clip, an audio clip, a clip containing a combination of video and audio, a video frame, a picture, etc. In one implementation, the server generates a feature vector based on the media clip. The feature vector can include one or more values based on one or more features of the media clip (e.g., color, texture, intensity, etc.). The feature vector is then input to a set of one or more classifiers (e.g., support vector machines [SVMs], AdaBoost, neural networks, decision trees, etc.), referred to herein as a "stage 1 classifier set," to obtain a first set of semantic tags based on the feature vector. The server then uses another classifier, referred to herein as the "stage 2 classifier," to generate an improved, second set of semantic tags from the first set of semantic tags. The stage 2 classifier may be a classifier that has been trained on multiple input-output pairs, where the input represents a set of semantic tags that previously have been suggested to one or more users for a particular media clip, and the output represents which of these tags were selected. As such, the stage 2 classifier learns from past user selections of tags and is able to improve the set of semantic tags generated by the stage 1 classifier set by confirming relevant tags, eliminating irrelevant tags, and predicting additional relevant tags. Consequently, a more appropriate set of tags for the media clip can be suggested to a user.

As an example, suppose that the stage 1 classifier set generates the following set of semantic tags based on a feature vector for a particular media clip:

cat
kitten
singing
yodeling
funny which are then input to the stage 2 classifier. The stage 2 classifier might then generate the following tags to be suggested to the user for the media clip:

cat
singing
talking
funny

In one implementation, the computer system presents the second set of semantic tags generated by the stage 2 classifier to the user as suggestions for the media clip, and allows the user to select one or more of the tags. Upon receiving the user's selections, the computer system can then apply the selected tags to the media clip and store the media clip in a data store, as permitted by the user.

Aspects and implementations of the present disclosure are thus capable of suggesting appropriate semantic tags to users who upload media clips to a content hosting website. This facility enables users to easily select semantic tags for the media clip, thereby increasing the likelihood that other users will find the media clip when submitting keyword searches, and facilitating the delivery of, for example, relevant advertisements to viewers of the media clip. In contrast, when users do not receive suggestions for their uploaded media clips, and are left to proactively tag the media clips without any automated assistance, users may not bother to tag the media clips, or may apply tags that are inappropriate or irrelevant. Aspects and implementations of the present disclosure can thus improve the quality of content descriptions, which in turn can improve the quality of searches and the targeting of advertisements. While aspects and implementations of the present disclosure are described with reference to media clips, aspects and implementations of the present disclosure also apply to other types of content items, such as webpages, textual documents, and so forth.

Figure 1:
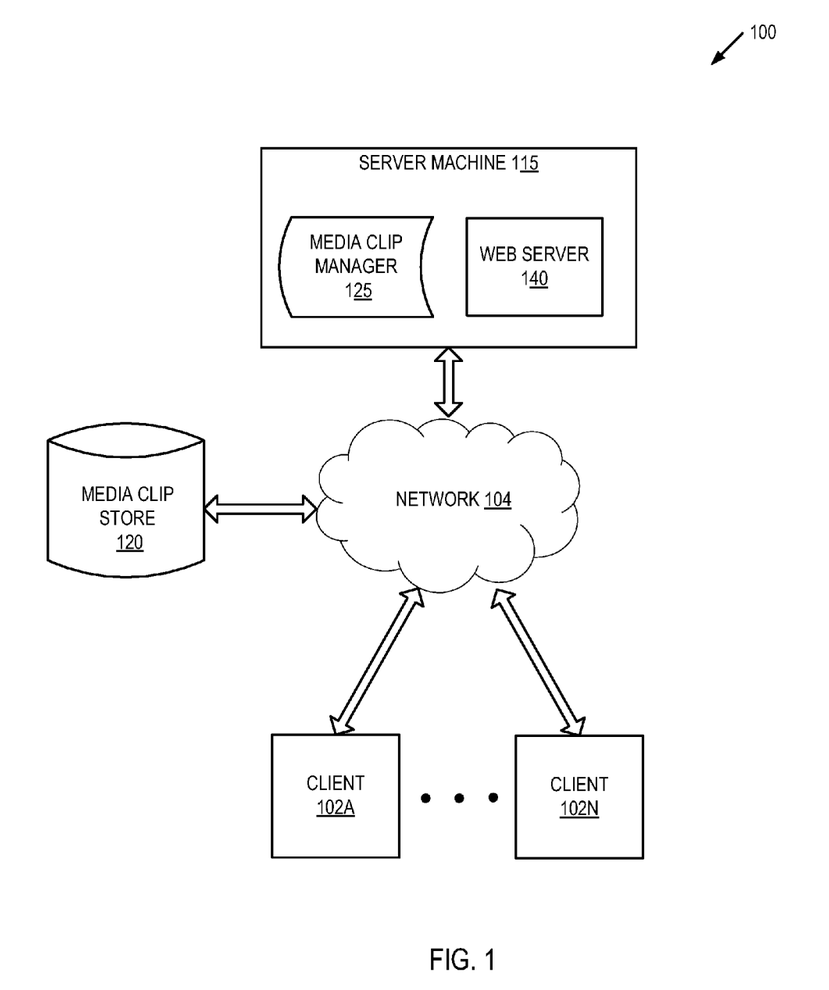
FIG. 1 illustrates an exemplary system architecture, in accordance with one implementation of the present disclosure.

FIG. 1 illustrates an example system architecture 100, in accordance with one implementation of the present disclosure. The system architecture 100 includes a server machine 115, a media clip store 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be wireless terminals (e.g., smartphones, etc.), personal computers (PC), laptops, tablet computers, or any other computing or communication devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image and/or video search queries to the web server or may enable browsing of images and/or videos that have previously been searched. The client machines 102A-102N may also upload images and/or video to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140 and a media clip manager 125. In alternative implementations, the web server 140 and media clip manager 125 may run on different machines.

Media clip store 120 is a persistent storage that is capable of storing media clips (e.g., video clips, audio clips, clips containing both video and audio, images, etc.) and other types of content items (e.g., webpages, text-based documents, etc.), as well as data structures to tag, organize, and index the media clips and other types of content. Media clip store 210 may be hosted by one or more storage devices, such as main memory, magnetic or optical storage based disks, tapes or hard drives, NAS, SAN, and so forth. In some implementations, media clip store 120 might be hosted by a network-attached file server, while in other implementations media clip store 120 may be hosted by some other type of persistent storage such as that of the server machine 115 or one or more different machines coupled to the server machine 115 via the network 104. The media clips stored in the media clip store 120 may include user-generated content that is uploaded by client machines. The media clips may additionally or alternatively include content provided by service providers such as news organizations, publishers, libraries and so on.

Web server 140 may serve content from media clip store 120 to clients 102A-102N. Web server 140 may receive search queries and perform searches on the contents of the media clip store 120 to identify content items that satisfy the search query. Web server 140 may then send to a client 102A-102N those content items that match the search query.

In accordance with some implementations, media clip manager 125 extracts features (e.g., color, texture, intensity, etc.) from uploaded media clips to generate feature vectors, creates semantic tags based on the feature vectors, and suggests the semantic tags to users. Media clip manager 125 can further receive input from users specifying user selection among the suggested semantic tags, apply selected tags to media clips, store the media clips and the semantic tags in media clip store 120 as permitted by the users, and index the media clips in media clip store 120 using the semantic tags. An implementation of media clip manager 125 is described in detail below with respect to FIGS. 2 through 5.

Figure 2:
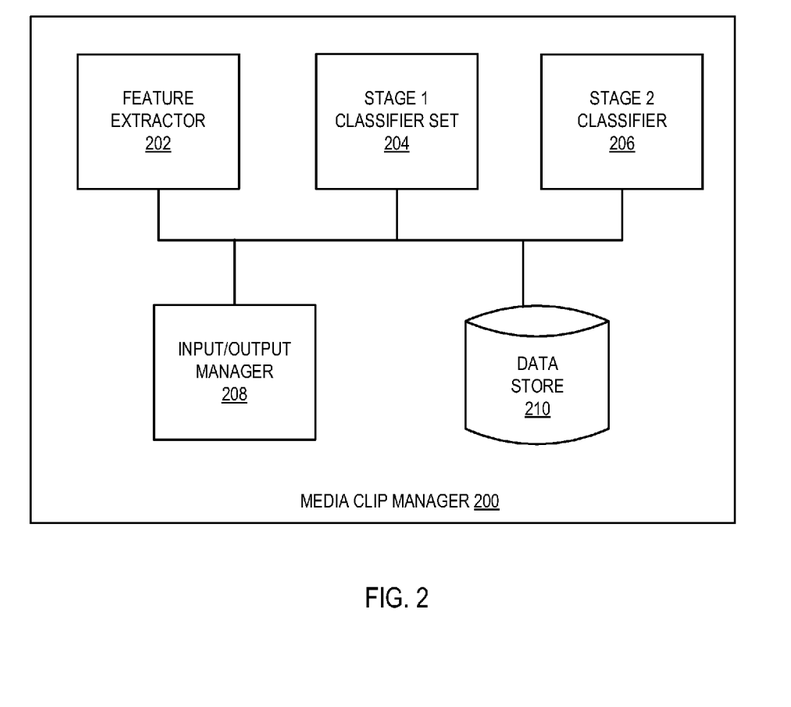
FIG. 2 is a block diagram of one implementation of a media clip manager.

FIG. 2 is a block diagram of one implementation of a media clip manager 200. The media clip manager 200 may be the same as the media clip manager 125 of FIG. 1 and may include a feature extractor 202, a stage 1 classifier set 204, a stage 2 classifier 206, an input/output manager 208, and a data store 210. The components can be combined together or separated in further components, according to a particular implementation.

The data store 210 may be the same as media clip store 120 or a different data store (e.g., a temporary buffer or a permanent data store) to hold one or more media clips that are to be processed, one or more data structures for indexing media clips in media clip store 120, semantic tags generated by stage 1 classifier set 204 and stage 2 classifier 206, user selections of semantic tags, or some combination of these data. Data store 210 may be hosted by one or more storage devices, such as main memory, magnetic or optical storage based disks, tapes or hard drives, and so forth. In one aspect, the media clip manager 200 notifies users of the types of information that are stored in the data store 210 and/or media clip store 120, and provides the users the opportunity to opt-out of having such information collected and/or shared with the media clip manager 200, The feature extractor 202 obtains a feature vector for a media clip using one or more techniques such as principal components analysis, semidefinite embeddings, Isomaps, partial least squares, and so forth. In some aspects, the computations associated with extracting features of a media clip are performed by feature extractor 302 itself, while in some other aspects these computations are performed by another entity (e.g., an executable library of image processing routines [not depicted in the Figures] hosted by server machine 115, etc.) and the results are provided to feature extractor 202.

The stage 1 classifier set 204 is a set of one or more classifiers (e.g., support vector machines [SVMs], AdaBoost, neural networks, decision trees, etc.) that accepts as input a feature vector associated with a media clip, and outputs a set of semantic tags for the media clip. In some implementations, stage 1 classifier set 204 consists of a single classifier, while in some other implementations, stage 1 classifier set 204 includes multiple classifiers (e.g., a classifier for every type of semantic tag in a tag dictionary, etc.).

In one implementation, the feature extractor 202 assembles, for each semantic tag in a tag dictionary, a set of positive examples and a set of negative examples. The set of positive examples for a semantic tag may include feature vectors for video clips that have been tagged with that particular semantic tag. The set of negative examples for a semantic tag may include feature vectors for video clips that have not been tagged with that particular semantic tag. In one aspect, when the set of positive examples and the set of negative examples are unequal in size, the larger set is randomly sampled to match the size of the smaller set.

The stage 1 classifier set 204 may then be trained for each tag using the feature vectors of corresponding positive and negative examples. In some aspects, the output of stage 1 classifier set 204 comprises a numerical score for each semantic tag indicating how strongly the tag is applicable to the media clip (e.g., a real number between 0 and 1 inclusive, etc.). The set of semantic tags may then be obtained from the output of stage 1 classifier set 204 by applying a minimum threshold to the numerical scores (e.g., by considering all tags that have a score of at least, say, 0.3, as being a member of the set). Alternatively, in some other aspects, the output of stage 1 classifier set 204 comprises a binary value for each semantic tag in the dictionary which indicates that the tag is either definitely in or definitely out of the set.

Input/output manager 208 may then present the resulting set of semantic tags ("suggested semantic tags") for the media clip to a user (e.g., the owner of the media clip). The user may then select one or more semantic tags from the set and add the selected tags to the description of the media clip. The suggested semantic tags and the selected semantic tags may be stored in the data store 210.

The stage 2 classifier 206 is a classifier (e.g., support vector machine [SVM], AdaBoost, neural network, decision tree, etc.) that accepts as input a first set of semantic tags, and, if available, respective scores for the first set of semantic tags, and outputs a second set of semantic tags, and, optionally, respective scores for the second set of semantic tags. In one aspect, stage 2 classifier 206 is trained on multiple input-output pairs, where the input includes a set of semantic tags that previously have been suggested to a user for a particular media clip, and where the output comprises the tags that were selected by the user. (Note that this subset might be the same as the input set, and not necessarily a proper subset of the input set.) For example, if the tags "apple," "banana," and "cherry" were previously suggested to a user who uploaded a media clip and the user selected "apple" and "cherry" from the suggestions, then the input-output pair ({apple, banana, cherry}, {apple, cherry}) might be included in the training set for the stage 2 classifier 206. Thus, by learning from past user selections of tags, the stage 2 classifier can improve the set of semantic tags that is generated by stage 1 classifier set 204 and thereby suggest to the user a superior set of tags for the media clip. It should be noted that in some other implementations, stage 2 classifier 206 includes multiple classifiers, as is the case for stage 1, rather than a single classifier.

The input/output manager 208 identifies when users have uploaded media clips to server 115, presents suggested semantic tags to users, receives users' selections, applies selected tags to media clips, and stores tagged media clips in the data store 210 and/or media clip store 120.

Figure 3:
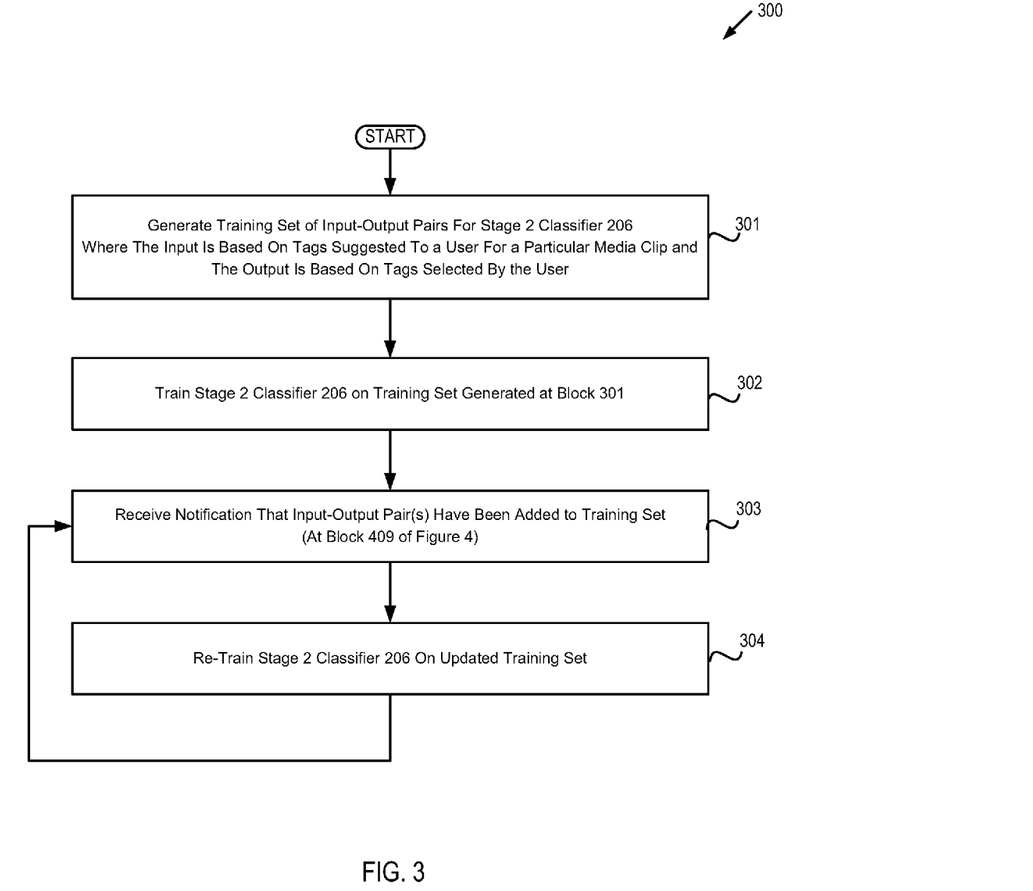
FIG. 3 depicts a flow diagram of aspects of a method for training a classifier.

FIG. 3 depicts a flow diagram of aspects of a method 300 for training stage 2 classifier 206. The method is performed by processing logic that may comprise hardware (circuitry, dedicated logic, etc.), software (such as is run on a general purpose computer system or a dedicated machine), or a combination of both. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 301, a training set of input-output pairs is generated, where the input is based on one or more semantic tags that previously have been suggested to a user for a particular media clip, and where the output is based on the tag(s) that were selected by the user. At block 302, stage 2 classifier 206 is trained on the training set generated at block 301.

At block 303, a notification is received that indicates that one or more input-output pairs have been added to the training set. (As described in detail below, the adding of input-output pairs to the training set is performed at block 409 of the method of FIG. 4.)

At block 304, stage 2 classifier 206 is trained on the updated training set. After block 304, execution continues back at block 303.

Figure 4:
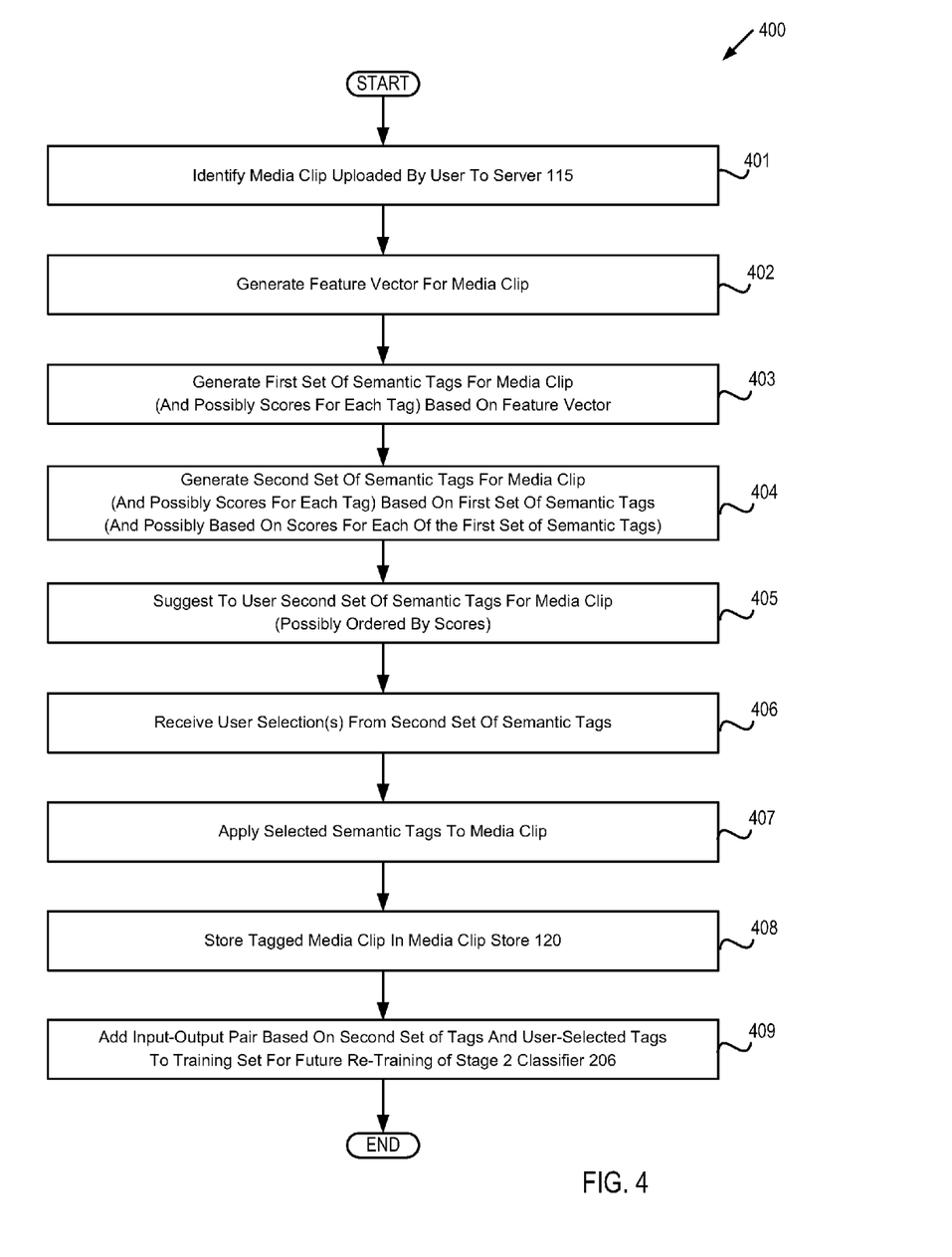
FIG. 4 depicts a flow diagram of aspects of a method for suggesting semantic tags for a media clip.

FIG. 4 depicts a flow diagram of aspects of a method 400 for suggesting semantic tags for a media clip. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more of blocks 401 through 409 are performed by another machine. It should be noted that in some implementations, various components of media clip manager 200 run on separate machines (e.g., feature extractor 202 and stage 1 classifier set 204 might run on one machine while stage 2 classifier 206 and input/output manager 208 might run on another machine, etc.).

At block 401, a media clip that is uploaded by a user to server 115 is identified. In accordance with one aspect, block 401 is performed by input/output manager 208.

At block 402, a feature vector is generated for the media clip. In accordance with one aspect, block 402 is performed by feature extractor 202.

At block 403, a first set of semantic tags for the media clip is generated based on the feature vector. In some aspects, respective scores for each of the tags are also generated, while in some other aspects, no such scores are generated. (It should be noted that the case in which no scores are generated can be considered a special case in which all of the scores are equal.)

In one aspect, block 403 is performed by stage 1 classifier set 204. For example, an input for stage 1 classifier set 204 may be generated based on the feature vector generated at block 402; stage 1 classifier set 204 may generate an output based on this input; and the first set of semantic tags, along with respective scores, may be generated based on the output. The input may be the values of the feature vector itself, or alternatively the input values may be derived from the feature vector in some fashion (e.g., by normalizing the values, by applying some function to the values, by combining some of the values in some manner, etc.). The output of stage 1 classifier set 204 may be scores for each of the semantic tags in a dictionary, and the first set of semantic tags may be generated by including only those tags whose scores are above a threshold. Alternatively, the first set of semantic tags may be obtained from the output of stage 1 classifier set 204 in some other fashion. It should also be noted that in some other aspects, an alternative technique is employed at block 403 to generate the set of semantic tags (e.g., a rule-based system that does not rely on a classifier, etc.).

At block 404, a second set of semantic tags for the media clip is generated based on the first set of semantic tags, and optionally based on the scores for each of the first set of tags (if generated at block 403) as well. In some aspects, respective scores for each of the second set of tags are also generated at block 404, while in some other aspects, no such scores are generated. (It should be noted that when stage 1 classifier set 204 is capable of generating a short list of tags for the first set, then, in some aspects, the tags may be treated equally [i.e., as though their scores are equal]).

n one aspect, block 404 is performed by stage 2 classifier 206. For example, the scores of semantic tags from the first set (i.e., those generated at block 403) that are above a chosen threshold may be input to stage 2 classifier 206, and stage 2 classifier 206 may generate a new set of scores, each corresponding to a respective semantic tag in the dictionary. The second set of semantic tags can then be generated by including only those tags whose scores are above a threshold.

It should be noted that in some other aspects, a classifier may be used in an alternative fashion at block 404 to generate the second set of semantic tags (e.g., representing the first set of semantic tags without associated scores, generating binary outputs for membership in the second set of semantic tags, etc.). In still other aspects, a technique other than a classifier (e.g., a rule-based system, etc.) may be employed at block 404 to generate the second set of semantic tags.

At block 405, the second set of semantic tags generated at block 404 (possibly ordered by scores, if scores were generated at block 404) is suggested to the user, and at block 406 the user's selection(s) from the second set of semantic tags are received. In accordance with one aspect, blocks 405 and 406 are performed by input/output manager 208.

At block 407, the semantic tags selected by the user and received at block 406 are associated with (e.g., applied or added to) the media clip, and at block 408 the tagged media clip is stored in media clip store 120. In accordance with one aspect, blocks 407 and 408 are performed by input/output manager 208.

At block 409, an input-output pair based on the second set of semantic tags and the tags selected by the user is added to a training set for future re-training of stage 2 classifier 206. In one aspect, the input is a representation of the second set of semantic tags, and the output is a representation of the user-selected tags. It should be noted that in some aspects, re-training of the stage 2 classifier 206 may occur at defined time intervals (e.g., periodically, etc.), while in some other aspects re-training may occur whenever a certain number of input-output pairs have been added to the training set, while in yet other aspects stage 2 classifier 206 may be continually re-trained as input-output pairs are added to the training set. It should also be noted that in some aspects, users may be randomly presented with tags from stage 1 classifier set 204; this increases the diversity of the training set, which can reduce self-reinforcement learning and overfitting.

Figure 5:
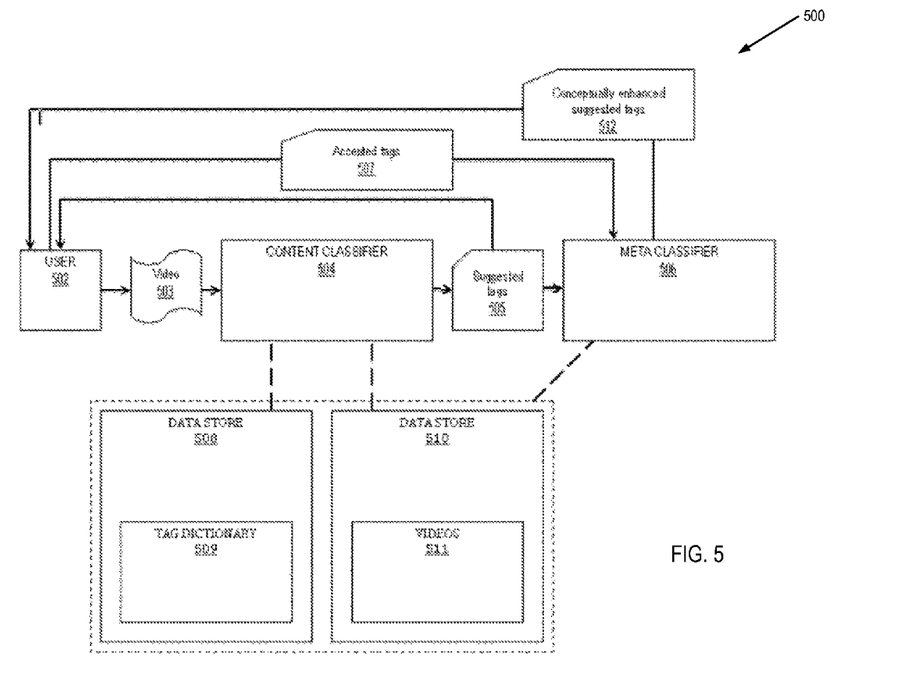
FIG. 5 is a block diagram illustrating an example flow illustrating aspects of this disclosure.

FIG. 5 is a block diagram illustrating an example flow to further illustrate aspects of this disclosure. While the flow is described below with reference to a video, the flow can be applicable to other content as well, such as an image, music, etc. The system 500 includes a stage 1 classifier (content classifier 504) and a stage 2 classifier (meta classifier 506). System 500 can also include a data store 508 that stores a tag dictionary 509. System 500 can also include a data store 510 that stores videos 511, such as previously uploaded by one or more users. Data store 508 and data store 510 can be different data stores or parts of the same data store. The data store 508 and 510 are operatively coupled to or otherwise accessible by the content classifier 504 and meta classifier 506.

The content classifier 504 extracts feature vectors from video content such as color, texture, audio, etc. For each tag (or label) in the tag dictionary 509, feature vectors for videos stored in data store 510 that are associated with the tag are identified for use as positive examples (a positive example set). In one implementation, also for each tag in the tag dictionary 509, features vectors for videos stored in data store 510 that are not associated with the tag are identified for use as negative examples (a negative set). When the size of the negative example set is large, a random sample of the negative example set can be used instead. In one implementation, the size of the random sample is selected to match the size of the positive example set. The content classifier 504 is trained for each tag using the video content features of corresponding positive and negative examples.

In FIG. 5, a user 502 transmits a video 503 to the content classifier 504. The content classifier extracts one or more feature vectors from the video 503 content such as color, texture, audio, etc. The trained content classifier uses the extracted feature vector(s) to identify one or more tags. For example, the trained content classifier can identify tags associated with videos stored in the data store 510 that have similar feature vectors. The trained classifier can score each identified tag based on a calculation of the similarity of the feature vector(s) already associated with the tag to the extracted feature vector of the video 503, generating a similarity score for each identified tag.

The content classifier 504 outputs suggested tags 505. The suggested tags 505 can be the identified tags, or a subset thereof based on, for example, a threshold similarity score. In one implementation, the content classifier 504 outputs suggested tags in rank order, based on the similarity scores. The suggested tags can be presented to the user 502. For example, a display can be presented to the user with an option to accept zero or more of the suggested tags as a description of the video. The suggested tags 505 and accepted tags 507 can be recorded for the video 503, as well as for other videos similarly processed.

The meta classifier 506 can be trained using the suggested tags 505 as feature vectors and the accepted tags 507 as labels. The meta classifier 506 can be used to re-estimate scores for tags in the tag dictionary 509 given tags which are identified by the content classifier based on the feature vectors. The meta classifier 506 can filter out those tags identified by the content classifier 504 that are conceptually irrelevant and can predict conceptually relevant tags given the context of the tags 505 suggested by the content classifier 504. Accordingly, the meta classifier 506 can present users with conceptually enhanced suggested tags 512.

Figure 6:
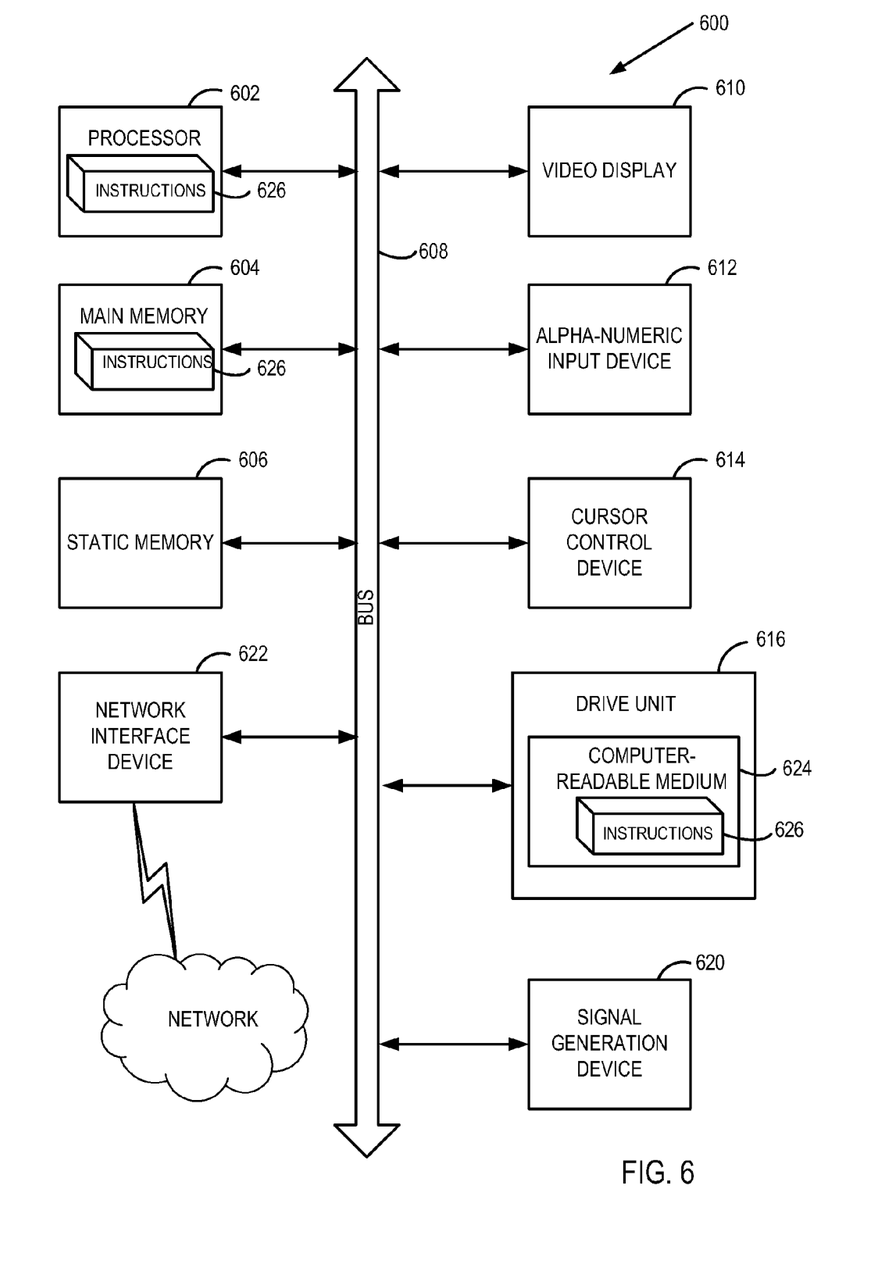
FIG. 6 depicts a block diagram of an illustrative computer system operating in accordance with aspects and implementations of the present disclosure.

FIG. 6 illustrates an exemplary computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a tablet computer, a mobile device, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by media clip manager 125 and corresponding to blocks 601 through 605 and 601 through 606, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that aspects and implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "generating," "providing," "receiving," "running," "suggesting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" or "an implementation" or "one implementation" throughout is not intended to mean the same aspect or implementation unless described as such.

It is to be understood that the above description is intended to be illustrative, and not restrictive. Many other aspects and implementations will be apparent to those of skill in the art upon reading and understanding the above description. Moreover, the techniques described above could be applied to other types of data instead of, or in addition to, video clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
   identifying a new media clip provided by a first user;
   providing a feature vector associated with the new media clip to a first classifier, wherein the feature vector associated with the new media clip includes a plurality of values representing one or more features extracted from content of the new media clip, wherein the first classifier was trained using a plurality of features vectors of a plurality of existing media clips to produce suggested semantic tags for respective existing media clips;
   obtaining, by a computer system, a first set of semantic tags for the new media clip from the first classifier;
   providing, by the computer system, the first set of semantic tags for the new media clip to a second classifier that was trained using input-output pairs, wherein an input of each input-output pair includes a subset of the suggested semantic tags that was previously produced by the first classifier and suggested to a second user for one of the respective existing clips, and wherein an output of the input-output pair includes one or more suggested semantic tags selected by the second user from the subset of the suggested semantic tags for the one of the respective existing clips;
   obtaining, by the computer system, a second set of semantic tags for the new media clip from the second classifier; and
   suggesting to the first user, by the computer system, the second set of semantic tags for the new media clip.

2. The method of claim 1 wherein the first classifier is trained for each of the suggested semantic tags using positive feature vector examples and negative feature vector examples, wherein the positive feature vector examples are feature vectors associated with existing media clips that have a corresponding tag, and the negative feature vector examples are feature vectors associated with existing media clips that do not have the corresponding tag.

3. The method of claim 1 wherein the subset of semantic tags suggested to the second user was generated by running the first classifier on a feature vector associated with the respective media clip.

4. The method of claim 1 further comprising:
   receiving from the first user one or more selections from the second set of semantic tags; and
   applying the selected semantic tags to the new media clip.

5. The method of claim 1 wherein each of the first set of semantic tags is associated with a respective score, and wherein one or more of the respective scores are provided to the second classifier.

6. The method of claim 1 wherein the second set of semantic tags is obtained by applying a threshold to the output of the second classifier.

7. The method of claim 1 wherein the second classifier generates a score for each of the second set of semantic tags, and wherein the second set of semantic tags is suggested in an order arranged by respective scores.

8. An apparatus comprising:
   a memory to store a plurality of existing content items; and
   a processor coupled to the memory, the processor to:
      provide a feature vector associated with a new content item to a first classifier, wherein the feature vector associated with the new content item includes a plurality of values representing one or more features extracted from content of the new content item, wherein the first classifier was trained using a plurality of features vectors of a plurality of existing content items to produce suggested semantic tags for respective existing content items;
      input a first set of semantic tags obtained from the first classifier for the new content item to a second classifier that was trained using input-output pairs, wherein an input of each input-output pair includes a subset of the suggested semantic tags that was previously produced by the first classifier and suggested to a first user for one of the respective existing content items, and wherein an output of the input-output pair includes one or more suggested semantic tags selected by the first user from the subset of the suggested semantic tags for the one of the respective existing content items;
      run the second classifier to obtain a second set of semantic tags for the new content item; and cause the second set of semantic tags to be presented to a second user as suggestions for the new content item.

9. The apparatus of claim 8 wherein the first classifier is trained for each of the suggested semantic tags using positive feature vector examples and negative feature vector examples, wherein the positive feature vector examples are feature vectors associated with existing media clips that have a corresponding tag, and the negative feature vector examples are feature vectors associated with existing media clips that do not have the corresponding tag.

10. The apparatus of claim 8 wherein the processor is also to:
   receive from the second user one or more selections from the second set of semantic tags; and
   apply the selected semantic tags to the new content item.

11. The apparatus of claim 8 wherein each of the first set of semantic tags is associated with a respective score, and wherein the processor is also to input one or more of the respective scores to the second classifier.

12. The apparatus of claim 8 wherein the second set of semantic tags is obtained by applying a threshold to the output of the second classifier.

13. The apparatus of claim 8 wherein the second classifier generates a score for each of the second set of semantic tags, and wherein the second set of semantic tags is presented in an order arranged by respective scores.

14. A non-transitory computer readable storage medium, having instructions stored therein, which when executed, cause a processing device to perform operations comprising:
   identifying a new media clip provided by a first user;
   providing a feature vector associated with the new media clip to a first classifier, wherein the feature vector associated with the new media clip includes a plurality of values representing one or more features extracted from content of the new media clip, wherein the first classifier was trained using a plurality of features vectors of a plurality of existing media clips to produce suggested semantic tags for respective existing media clips;
   obtaining, by processing device, a first set of semantic tags for the new media clip from the first classifier;
   providing, by the processing device, the first set of semantic tags for the new media clip to a second classifier that was trained using input-output pairs, wherein an input of each input-output pair includes a subset of the suggested semantic tags that was previously produced by the first classifier and suggested to a second user for one of the respective existing clips, and wherein an output of the input-output pair includes one or more suggested semantic tags selected by the second user from the subset of the suggested semantic tags for the one of the respective existing clips;
   obtaining, by the computer system, a second set of semantic tags for the new media clip from the second classifier; and
   suggesting to the first user, by the computer system, the second set of semantic tags for the new media clip.

15. The non-transitory computer readable storage medium of claim 14 wherein
   the first classifier is trained for each of the suggested semantic tags using positive feature vector examples and negative feature vector examples, wherein the positive feature vector examples are feature vectors associated with existing media clips that have a corresponding tag, and the negative feature vector examples are feature vectors associated with existing media clips that do not have the corresponding tag.

16. The non-transitory computer readable storage medium of claim 14, wherein the subset of semantic tags suggested to the second user was generated by running the first classifier on a feature vector associated with the respective media clip.

17. The non-transitory computer readable storage medium of claim 14, wherein the operations further comprises:
   receiving from the first user one or more selections from the second set of semantic tags; and
   applying the selected semantic tags to the new media clip.

* * * * *